UNITED STATES PATENT OFFICE.

JULES H. HIRT, OF BROOKLINE, MASSACHUSETTS.

METHOD OF MAKING INGREDIENTS FOR PLASTER COMPOUNDS.

No. 801,873.   Specification of Letters Patent.   Patented Oct. 17, 1905.

Application filed June 28, 1905. Serial No. 267,343.

*To all whom it may concern:*

Be it known that I, JULES H. HIRT, a citizen of the United States, residing at Brookline, in the county of Norfolk and State of Massachusetts, have invented certain new and useful Improvements in Methods of Making an Ingredient for Plaster Compounds; and I do hereby declare the following to be a full, clear, and exact description of the invention, such as will enable others skilled in the art to which it appertains to make and use the same.

The present invention relates to an improvement in the method of making an ingredient for plaster compounds.

In the manufacture of some prepared plasters which are put up in bulk and after mixing with water are ready for immediate use one of the ingredients consists of slaked lime or a mixture of slaked lime with other material. The slaking of the lime has until recently been a tedious and expensive process. Recent improvements in the methods and apparatus for slaking lime have much reduced the time and expense of such a process. One of these improvements in the method of slaking lime involves the use of a closed receptacle in which the slaking process is carried on; but this method produces a lime which is lumpy and flaky, and therefore requires grinding before being bolted or screened and mixed with the other ingredients.

According to the present invention the slaking of the lime is accomplished in a closed receptacle, but in such an improved manner that the lime does not need to be ground, bolted, or screened after the slaking operation.

Another feature of the invention resides in carrying on the process of slaking the lime in a closed vessel in the presence of pulverulent carbonate, such as marble-dust. I have found that the plaster ingredient produced by this method is a much superior ingredient. The reason for this I do not precisely know; but it seems that there is some mass reaction by which the subsequent process of hardening is much accelerated.

The present invention consists in the improved method of making plaster ingredient herein described, and particularly defined in the claims.

According to the present invention the plaster ingredient consists of slaked lime or slaked lime mixed with a carbonate, such as marble-dust, and the specific method practiced by me when making this ingredient is described as follows:

As an ingredient for rough plaster or first-coat plaster equal quantities, by weight, of quicklime the particles of which are of the size of wheat or corn and marble-dust ground to one hundred mesh are intimately mixed and introduced into a vessel, which is then closed, and a quantity of water equal in weight to forty to forty-five per cent. of the weight of the lime is gradually introduced into the vessel. The water slakes the lime, and during the slaking process the mixture is stirred, so as to expose every portion of the lime to the moisture, and during the slaking process the pressure and temperature in the vessel rise, the former to about eighty to one hundred pounds per square inch and the latter to from 300° to 400° Fahrenheit. With the charge of a ton and a half of material it requires about one hour for the slaking process to be completed, at the end of which time and while the charge is still hot, but after the pressure has fallen to about atmosphere the vessel is connected with a steam-exhauster and a vacuum of ten pounds below atmospheric pressure is produced, which operates to take away any excess of moisture present in the mass and which has not chemically combined with the quicklime. The amount of water originally added is in excess of the amount required to chemically satisfy the quicklime in order to secure the slaking of the entire quantity of lime. This excess is withdrawn by this step. Upon the application of the vacuum to the vessel the material therein seems to be thrown into a violent state of ebullition, from which it gradually subsides as the moisture is withdrawn. This, it is believed, results from the expansion of the small particles of moisture in the mixture. During the application of the vacuum to the receptacle the stirring of the mass is continued, and with a charge of the size above referred to the duration of the application of the vacuum should be from five to ten minutes. The product of this process is an exceedingly fine dry pulverulent mass of slaked lime intimately mixed with marble-dust, which dust has been somewhat acted upon by the process in a manner which gives the plaster superior hardening and tensile qualities.

The above-described proportions are those used in making the plaster ingredient for use in the manufacture of rough or first-coat plaster. In the manufacture of skim or finish coat plaster the proportion of marble and lime is changed from that above given by increasing the amount of marble to twice the amount of lime. For example, in making ingredient for rough-coat plaster fifteen hundred pounds each of lime and marble-dust would be used, while in making ingredient for the skim or finish coat plaster one thousand pounds of lime and two thousand pounds of marble-dust would be used.

The rough-coat ingredient may be mixed with an article of commerce known as "asbestos-sand" in the proportion, by weight, of two of the ingredient to five of the sand and forms an efficient rough-coat plaster. The skim or finish coat ingredient should be mixed with one part of short asbestos fiber to six parts of the ingredient.

While it is stated in the foregoing specification that lime slaked in accordance with the present method does not need to be ground, bolted, or screened after the slaking operation, still it is preferred to bolt the product before use in order to remove small particles of incompletely-calcined lime which, because of its incomplete calcination, have not been perfectly hydrated in the slaking operation. These particles, of which the largest do not exceed the size of coarse sand, are preferably removed because of the liability of subsequent hydration of these particles done after the plaster has been applied, causing what is known as "popping" and "blistering."

The fact has been adverted to that the mixing of the carbonate, such as marble-dust, with the quicklime before slaking improves the qualities of the product. As nearly as I am able to ascertain this is due to a mass reaction which takes place during the slaking operation. This is an important feature of the invention and contributes in a marked degree to the success of the method by reason of the superior hardening and tensile qualities possessed by plaster made with this ingredient. Another quality of the product which flows from this feature of the invention is the initial set which plaster made from it has. This quality of the product is of great value, because of the rapidity with which the plaster may be finished and of the time saved thereby.

It is to be observed that while an excess of water sufficient to slake the lime is introduced into the receptacle such excess is not large and the mass never becomes more than damp. It is never caked or formed into paste.

Having thus described the invention, what is claimed is—

1. The method of making a plaster ingredient which consists in mixing a pulverulent carbonate with pulverulent quicklime in a closed vessel and adding water, substantially as described.

2. The method of making a plaster ingredient which consists in mixing marble-dust with pulverulent quicklime in a closed vessel and adding water, substantially as described.

3. The method of making a plaster ingredient which consists in introducing quicklime into a closed vessel, adding water in excess of that required to slake the lime, and subsequently exhausting the excess moisture from the receptacle, substantially as described.

4. The method of making a plaster ingredient which consists in introducing quicklime into a closed vessel, adding water in excess of that required to slake the lime, and then, while the charge is still hot, exhausting the excess moisture from the receptacle, substantially as described.

5. The method of making a plaster ingredient which consists in mixing marble-dust and quicklime in a closed receptacle, adding water in excess of that required to slake the lime, and subsequently exhausting the excess moisture, substantially as described.

6. The method of making a plaster ingredient which consists in mixing a pulverulent carbonate with pulverulent quicklime in a closed vessel and adding water slightly in excess of that required to slake the lime but insufficient to render the mass pasty, substantially as described.

In testimony whereof I affix my signature in presence of two witnesses.

JULES H. HIRT.

Witnesses:
  HORACE VAN EVEREN,
  ALFRED H. HILDRETH.